United States Patent [19]

Grosso et al.

[11] 4,127,816
[45] Nov. 28, 1978

[54] CARRIER DETECT AND AUTOMATIC LOOPBACK CIRCUIT

[76] Inventors: Clair R. Grosso, 616 Tasker Ave., Folsom, Pa. 19033; Richard M. Gatti, 618 Warren Blvd., Broomall, Pa. 19008; Robert J. Miles, 61 Rorer Ave., Hatboro, Pa. 19040; Raymond D. DiSandro, 9776 Roosevelt Blvd., Philadelphia, Pa. 19115

[21] Appl. No.: 710,584

[22] Filed: Aug. 2, 1976

[51] Int. Cl.² .......................................... H04B 17/00
[52] U.S. Cl. ............................... 325/67; 179/175.3 R
[58] Field of Search ............. 325/2, 67; 179/175.3 R, 179/175.3 S, 2.5 R, 15 BF; 340/147 SC

[56] References Cited
U.S. PATENT DOCUMENTS

| | | | |
|---|---|---|---|
| 3,519,935 | 7/1970 | Hochgraf | 325/2 |
| 3,843,848 | 10/1974 | Cox | 179/175.3 R |
| 3,952,163 | 4/1976 | Couturier et al. | 179/175.3 R |

*Primary Examiner*—Robert L. Griffin
*Assistant Examiner*—Jin F. Ng
*Attorney, Agent, or Firm*—Paul & Paul

[57] ABSTRACT

A master station communicates with remote stations by respective transmit-receive pairs. Quadra-phase modulation is utilized, involving a carrier having two characteristic frequencies not present during bursts of a communicated signal, which bursts are known to last for a fixed duration. Signals on a receive pair are detected, and phase locked loops are tuned to the characteristic frequencies of the carrier and produce logical signals to indicate whether the characteristic frequencies are present. If not, a timer is energized to inhibit institution of a loopback condition for the duration of a data burst, after which the phase locked loops are permitted to enable the loopback.

7 Claims, 4 Drawing Figures

CARRIER DETECT AND AUTOMATIC LOOPBACK CIRCUIT

BACKGROUND OF THE INVENTION

This invention relates to data transmission systems, and more particularly to systems for testing the integrity of data communication systems whenever particular operational faults occur.

A common class of data gathering system involves a central or "master" retrieving and control facility, communicating over fixed communication channels such as telephone lines, with spacially disparate "remote" terminals. The master has transmission and reception capability with respect to each remote, and each remote is coupled to the master by a receive wire pair and a different transmit pair. In the event that an interruption of communication occurs between the master and a remote, it is evident that the master, the remote, and the four wire transmit/receive channel are separate candidates for the cause of the fault. Of course, a malfunction at the master may be simply and conveniently dealt with; due to the disparate locations of the remote, however, adequate testing for malfunctions thereat is often inconvenient and expensive. This inconvenience and expense is most acutely felt when a person or crew is dispatched to the remote terminal, only to discover that the malfunction causing the service interruption occurred in the transmission system interconnecting the master and the remote, rather than at the remote.

It is an object of the present invention to provide apparatus, located at remote terminals, which senses communication interruptions of specified types, and which, in response thereto, automatically connects the four wire receive/transmit circuit into a "loopback" mode, thereby temporarily removing the remote terminal from the circuit and allowing testing of the transmission circuit from the master.

One constraint which is generally imposed on master-remote testing apparatus relates to the use of leased telephone circuits. That is, by far the most common transmission circuit utilized in the systems above described are telephone lines, and rigid functional constraints are imposed thereby. First, the characteristics of any apparatus hooked across a telephone line must be compatible with the telephone system voltage, current, power, and frequency characteristics and limitations. Moreover, it is understood that the proprietors of the telephone system engage in periodic tests themselves to maintain the integrity of their system.

It is a further object of the present invention to provide automatic testing apparatus which, although connected directly across a telephone line pair, not only meets functional interconnection limitations, but which furthermore is "not seen" by telephone testing apparatus and procedures, and which conducts its own sensing and testing procedures without disturbance, interruption, or error caused by spurious signals such as are involved in the tests conducted by the proprietors of the telephone circuits.

It will be appreciated that the source of communication interruption between master and remote terminals may be due to any of a variety of conditions. For example, these may include attenuation or complete loss of the transmission signal between the master and the remote (i.e., faults which would be attributed to the telephone transmission circuit), or partial or complete loss of power at the remote terminal.

It is a further object of the present invention to provide apparatus and methods for placing data systems of the type described above into a loopback mode automatically upon occurrence of complete or partial loss of power at the remote terminal, or of loss or attenuation of transmission from the master to the remote.

It is yet another object that the foregoing be accomplished while permitting flexibility and adaptability of operation, whereby fault detection and loopback is accomplished for different data characteristics, different remote terminal power supply capabilities, and different data modulation schemes.

An illustrative system to which the principles of the present invention may be applied, but without limitation thereto, is a quadra-phase modulation system. In such systems, bursts of data of predetermined duration are modulated onto a carrier. The carrier displays two characteristic frequency components. Between bursts, the unmodulated carrier is transmitted. Characteristic frequency is used herein in its standard meaning "a frequency which can be easily identified and measured in a given emission" as defined in DICTIONARY OF SCIENTIFIC AND TECHNICAL TERMS, McGraw Hill Book Co., New York, NY, 1974.

SUMMARY OF THE INVENTION

The present invention is based on the proposition that transmission attenuation or loss may be detected by monitoring distinctive carrier characteristic frequencies which are present during lapses in transmitted data, but which, due to modulation, are not present in data bursts. Hence, absence of those characteristic frequencies may be taken to be indicative either of data transmission, or absence of data transmission (i.e., a fault). In order to discriminate between these conflicting alternatives, the principles of the present invention involve logical operations, energized by first detection of absence of the characteristic frequencies, which delay a loopback condition at least for the duration of a typical data burst. Thereafter, if the characteristic frequencies are still not present, the loopback condition is instituted. In order also to account for power failures at the remote terminal, the detection and logic circuitry which is utilized to identify transmission failures is operated in association with the power supplies of the remote terminal apparatus. The loopback switching apparatus is configured such that a failure of power to the detection logic occasioned by power reduction or failure to the remote terminal, automatically institutes the loopback condition.

In an illustrative embodiment, a suitably isolated amplifier having voltage surge protection senses signals at the receive input of the remote terminal. First and second phase locked loops are tuned to respective corresponding characteristic carrier frequencies. Suitable filter means facilitate detection and capture by the loops, of the characteristic frequencies. Logical operations associated with the phase locked loops indicate presence or absence of the associated characteristic frequencies, which logical signals are utilized for identification of transmission failure or attentuation. Whenever one of the characteristic frequencies is absent, a timer is energized, which inhibits institution of a loopback condition for the duration of a typical data burst. At the termination of the timing cycle, if the characteristic frequency still is absent, logic is energized to switch the transmission circuit into loopback.

DETAILED DESCRIPTION

Figure 1:
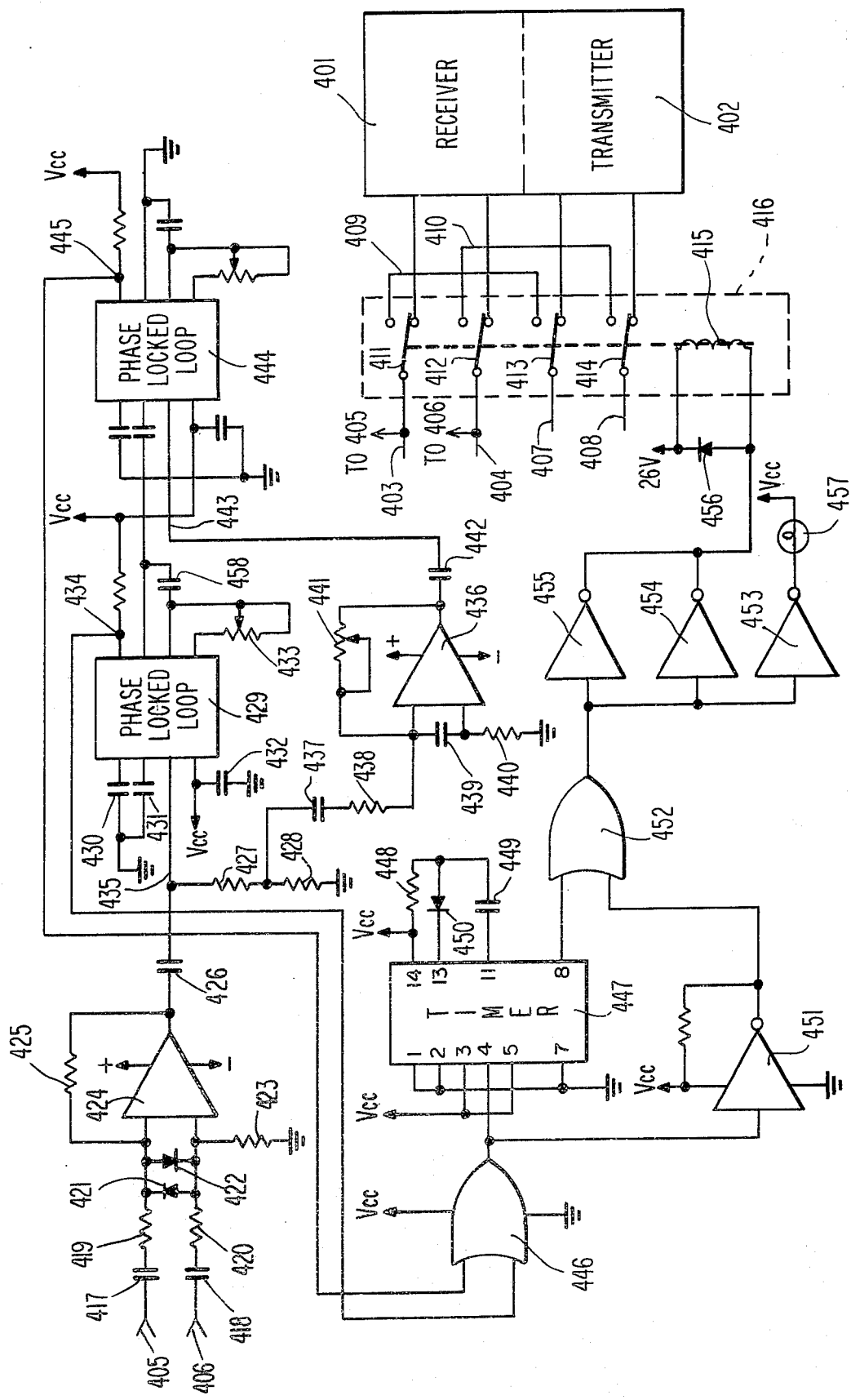
FIG. 1 shows a schematic diagram of a preferred embodiment of the principles of the present invention.

The embodiment shown in FIG. 1 is adapted for operation in conjunction with a quadra-phase modulated data system wherein communication between master and remote units occurs over a standard two pair (i.e., four wire) telephone data transmission line. Further, the particular embodiment disclosed is adapted for operation in such a system utilizing a carrier having two distinctive characteristic frequencies. Data is transmitted to the receiver along a "receive" pair in bursts of predetermined duration, between which the unmodulated carrier is transmitted. Due to the modulation, the characteristic carrier frequencies are not present. It is to be understood, however, that the principles of the present invention, as described hereinbefore and claimed hereinafter are not limited to transmission systems of those precise characteristics, and that with minor modifications obvious to those of ordinary skill in the art, systems incorporating the principles of the present invention may be adapted to sundry different data transmission systems.

In FIG. 1, a remote terminal is represented symbolically as a receiver 401 and transmitter 402. It is understood that the remote terminal generally will include apparatus for numerous addition functions, not relevant to the principles of the present invention. Further, the receiver and transmitter aspects thereof may be embodied by a variety of modems (i.e., modulator-demodulator) commercially available, or any special purpose apparatus desired. A receive pair of lines 403 and 404 are coupled to the receiver 401 by switches 411 and 412 (i.e., relay contacts) when in the position shown. Lines 403 and 404 convey data via the telephone system from the master terminal to the receiver. Lines 407 and 408 constitute the "transmit" lines for the remote terminal, and couple data via the telephone system to the master terminal when switches 413 and 414 are in the position shown. Switches 411 through 414 constitute a ganged quadruple pole double throw switch under the control of coil 415, which are normally in the deenergized position connecting buses 409 and 410. When coil 415 is energized, switches 411 through 414 are placed in the position shown in FIG. 1, thereby to disconnect buses 409 and 410 to terminate the loopback condition, by interconnecting the receive lines 403 and 404 and the transmit lines 407 and 408, respectively, with the receiver 401 and transmitter 402.

Data incoming to the receiver 401 on lines 403 and 404 is tapped at 405 and 406 and coupled to a pair of DC isolation capacitors 417 and 418. Diodes 421 and 422 provide protection from voltage surges such as may occur due to lightning, telephone company test signals, or other such transient high voltages which might damage the circuitry. Amplifier 424 is a high input impedance operational amplifier of common commercial pedigree (e.g., "741" operational amplifier) and is biased for operation in balanced differential mode having a predetermined gain.

A capacitor 426 provides DC isolation to the subsequent circuitry, and the detected, amplified signal from the receive line 403 and 404 is coupled to a first phase locked loop 429. The phase locked loop 429, as well as a second phase locked loop 444 discussed hereinafter, is preferably embodied as one of many integrated circuits which are commercially available, for example from Signetics as a "567" chip, or numerous equivalent alternatives. The phase locked loops 429 and 444 both involve rather standard phase locking operations, each including a local reference oscillator tuned to a predetermined frequency and having a desired capture range based on the circuitry attached thereto.

The output terminal 434 of the first phase locked loop 429 is maintained at a logical state indicative of whether or not the input signal 435 is synchronous with the local oscillator of the loop 429. So long as it is, a logical 0 is maintained at output terminal 434 and coupled to an OR gate 446. Whenever the signal at input terminal 435 to loop 429 is not synchronous with the internal oscillator of the loop, indicating that the characteristic frequency of the carrier to which the first phase locked loop 429 is absent, a logical 1 is produced at output terminal 434 of the loop 429, and conveyed to the OR gate 446.

For some systems, it will be adequate to couple the signal from amplifier 424 directly to a second phase locked loop for detection of a corresponding second characteristic frequency in the carrier. Depending on the overall composition and character of the carrier, however, and of the spectral locations of the various characteristic frequencies relative to each other, simple coupling of the carrier from amplifier 424 directly to the respective phase locked loops may not be appropriate. In such instances, it is useful to interpose a filter between the input amplifier 424 and a second phase locked loop such as 444, in order generally to isolate the frequency component to be coupled to the phase locked loop. In FIG. 1, signals from the amplifier 424 via capacitor 426 are coupled to a voltage divider 427 and 428, the division point of which feeds a filter comprising amplifier 436 and associated biasing circuitry. The active filter is designed generally to provide a predetermined amount of gain to signals in the frequency range of the second characteristic frequency being synchronized at phase locked loop 444, and to provide 0 gain, that is, blocking, for all other signals. The amplifier 436 of the active filter is advantageously embodied identically to the foregoing amplifier 424. Capacitors 437 and 439 and resistors 438 and 440, in conjunction with variable feedback resistor 441 determine the pass frequency range and the gain of the amplifier 436. The "cleaned up" carrier, attuned to the characteristic frequency corresponding to the second phase locked loop 444, is coupled by capacitor 442 to the input terminal 443 of the loop 444.

Like the foregoing phase locked loop 429, the second phase locked loop 444 has an internal reference oscillator corresponding to a second characteristic frequency in the carrier, and produces a logical 0 output at terminal 445 so long as the signal at input terminal 443 is synchronous with the phase locking reference. Whenever the characteristic frequency is not present at input terminal 443, a logical 1 output is produced at terminal 445, and thence coupled to the OR gate 446.

Whenever either of the characteristic frequencies associated to the phase locked loops 429 and 444 are not present in the signal developed at amplifier 424, a logical 1 appears at a corresponding input to OR gate 446, and hence a logical 1 appears at the output thereof. This signal is advanced along two paths, a first path via inverter 451 to another OR gate 452. The other path from OR gate 446 is to input terminal 4 of a one shot circuit 447. The one shot 447 functions to generate a logical pulse at its output terminal 8 for a predetermined period after the first introduction of the logical 1 to input terminal 4. In a preferred embodiment, the one shot 447 is embodied as a "121 timer" of the 7400 series logic commercially available from many manufacturers. The terminal numbers shown in FIG. 1 correspond to the standard pin designations for that timer. The duration of the logical output pulse is established by resistor 448, capacitor 449, and diode 450, which are coupled respectively to terminals 14, 13, and 11 as shown. The timing duration of the pulse produced at output terminal 8 of timer 447 is adjusted, by selection of the resistor 448 and the capacitor 449, to be the duration of a data burst coupled to the receiver 401 from the master terminal.

Thus, the output of OR gate 452 is a logical 1 so long as both characteristic frequencies are present in the signal developed at amplifier 424, and logical 1's are coupled from phase locked loops 429 and 444 to both input terminals of OR gate 446. Whenever one or both of those frequency components are absent at the input amplifier 424, the input to OR gate 452 via inverter 451 becomes a logical 0. During the duration of the output pulse from timer 447, however, the output of OR gate 452 remains a logical 1. If after the termination of the pulse at output terminal 8 of timer 447 the characteristic frequencies still are absent from the carrier monitored at amplifier 424, both inputs to OR gate 452 become a logical 0, and the output thereof also becomes a logical 0. If, however, the changed output from OR gate 446 was due to presence of a data burst on receive lines 403 and 404, by the time the pulse from timer 447 terminates, logical 0's will once more be produced by the phase locked loops 429 and 444, and a logical 1 will be provided to OR gate 452 via inverter 451.

The logical signal from OR gate 452 is coupled via a pair of inverters (doubled for current driving capacity) 454 and 455 to the relay control coil 415 for relay switches 411 through 414. Also, a control light 457 indicates the condition of the switches 411 through 414 by monitoring an inversion at 453 of the logical signal from OR gate 452.

Whenever a logical 1 is produced from OR gate 452, the lower terminal of coil 415 is "low", and the switches remain in the position shown. When a logical 0 is produced from OR gate 452 (i.e., the "no characteristic frequency" condition described above), a "high" is provided to disable coil 415, and switches 411 through 414 are switched to their alternate, or loopback positions.

In partial summary, the apparatus of FIG. 1 provides a basis for loopback control of switches 411 through 414 by monitoring characteristic frequencies in the carrier, producing logical signals at 434 and 445 indicating presence thereof, and deenergizing relay 415 to switch into the loopback mode if those characteristic frequencies still are absent after timer 447 produces a pulse at output terminal 8 equivalent to the time of a data burst on receive line 403 and 404.

The embodiment of FIG. 1 is configured also to provide control of the switches 411 through 414 based on failure of power at the remote terminal. It will be noted that amplifiers 424 and 436, phase locked loops 429 and 444, timer 447, and a variety of the other logic circuitry are provided power from various sources designated "$V_{cc}$". In accordance with the preferred circuitry specified above for embodiment of those elements, a variety of power supply voltage levels are appropriate for each. Thus, in order to control the switches 411 through 414, the various power supply voltages are connected to one or more corresponding power supply points in the remote terminal which may be deemed critical from the testing standpoint. This may be done by connection of some or all of the designated "$V_{cc}$" supply points to an appropriate common level in the transceiver, by connection of some or all of the designated "$V_{cc}$" points to different corresponding critical supply points in the remote terminal, or by connection of the various "$V_{cc}$" power supply levels to scaled versions of an overall power supply from the remote terminal. Whichever option is selected, the result of the logical configuration shown in FIG. 1 will be an operation of switches 411 through 414 into the loopback mode upon failure of power to one or more of the circuit elements in FIG. 1.

For example, a common type of remote terminal system utilizes a multiple level power supply system including voltages of $+26$, $+15$, $+5$, and $-15$ volts. In order to provide automatic loopback responsive to power failure therein, the embodiment of FIG. 1 operates coil 415 from the 26 volt source, amplifiers 424 and 436 from the positive and negative 15 volt sources, and the remainder of the logical elements from the 5 volt source. In view of the logical configuration shown in FIG. 1, failure of any one of those sources will result in operation of switches 411 through 414 into the loopback mode.

Figure 2:
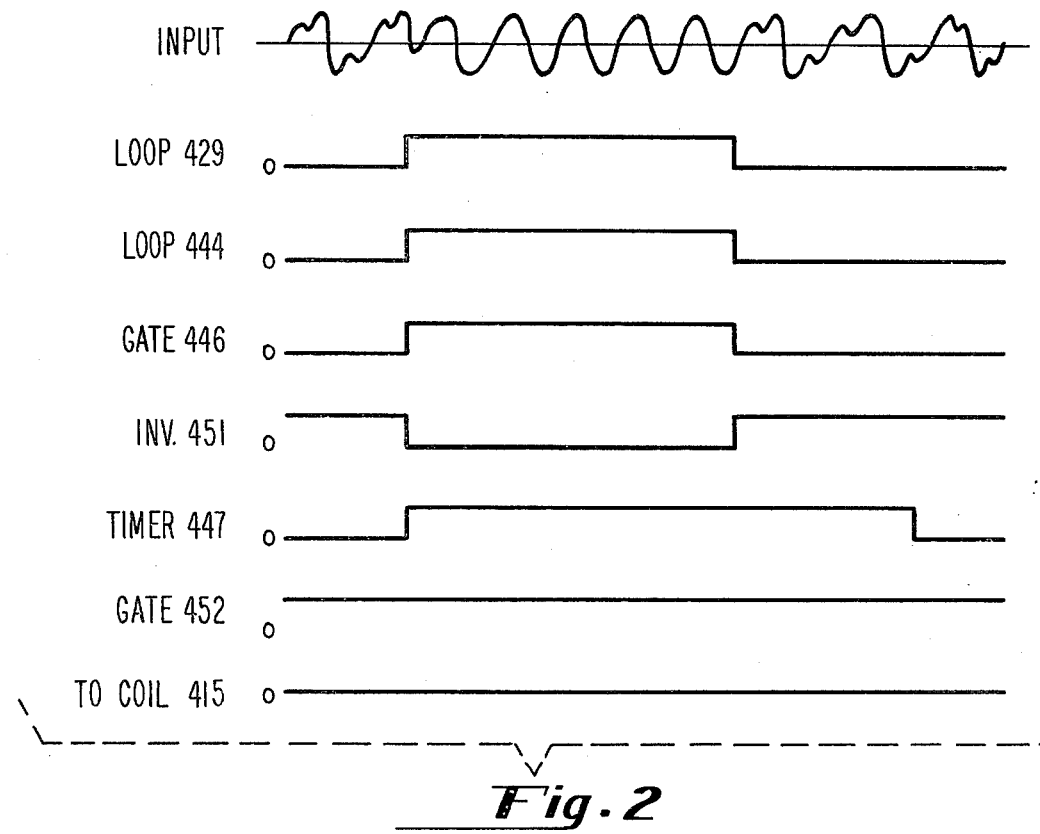
FIGS. 2 through 4 show waveforms associated with the operation of the embodiment of FIG. 1.
Figure 3:
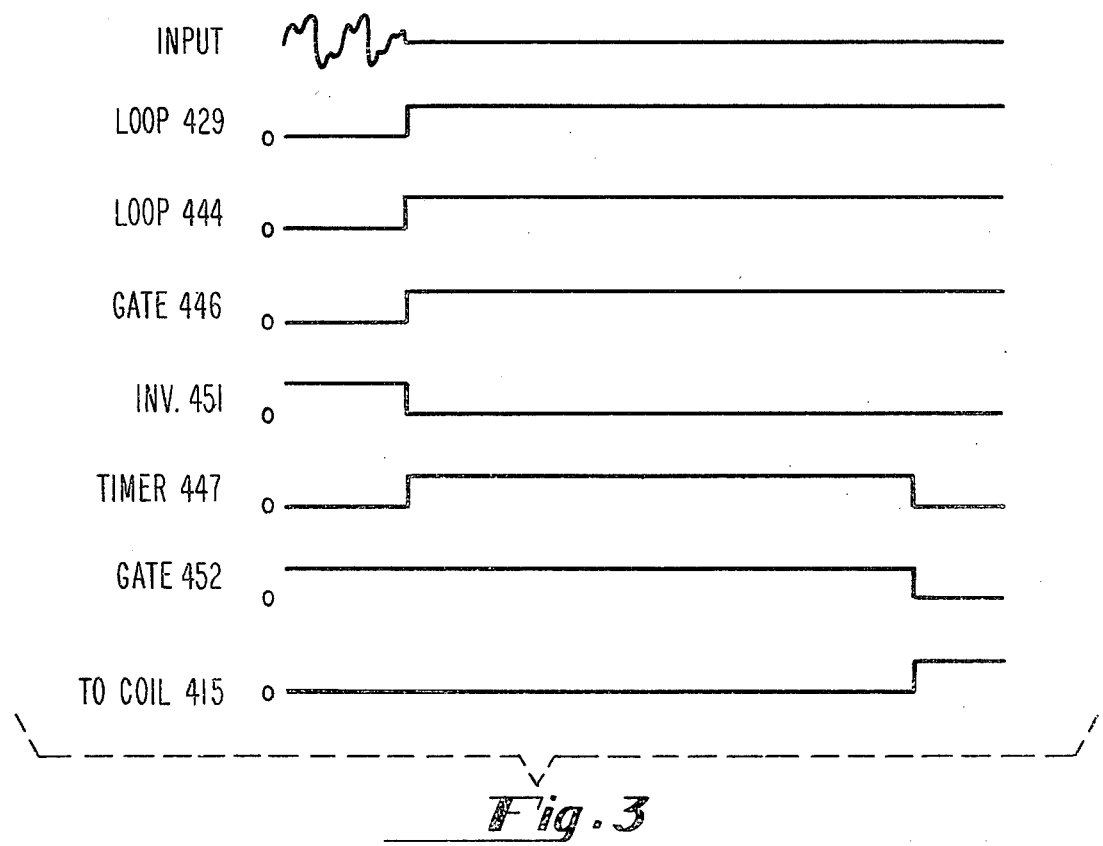
Figure 4:
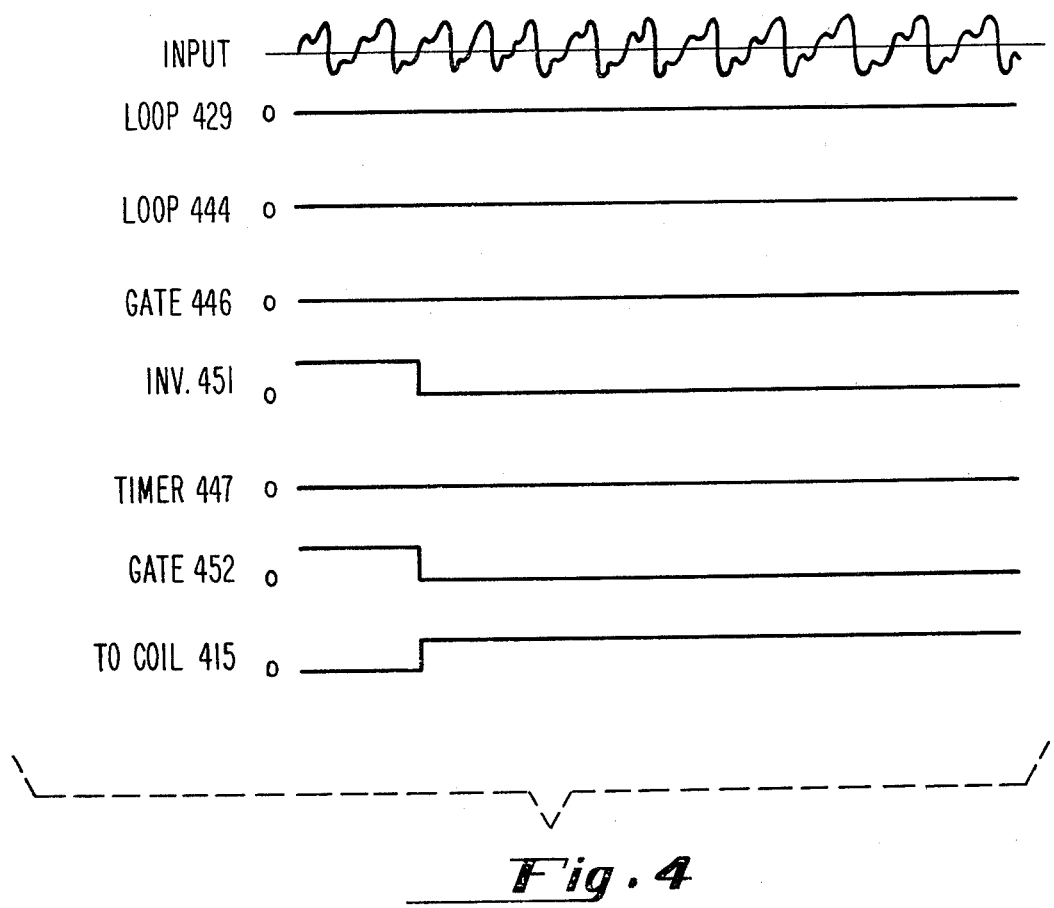

The operation of the embodiment of FIG. 1 for both signal or power failure conditions may be better appreciated upon consideration of FIGS. 2 through 4, inclusive, which show a series of waveforms representative of various conditions to which the embodiment of FIG. 1 is responsive, assuming the power supply conditions of the foregoing example. Each of FIGS. 2 through 4 includes an input waveform representative of critical signal conditions on the receive line pair 403 and 404. Accompanying each such critical signal condition are depictions, respectively, of logical states at: the output of phase locked loop 429; the output of phase locked loop 444; the output of OR gate 446; the output of inverter 451; the output of timer 447; the output of OR gate 452; and the output of inverters 454 and 455.

In FIG. 2, there is shown an example of normal operation having a carrier interrupted by a data brust, followed by return of the carrier. A continuous, normal state is maintained at the output of inverters 454 and 455, and no loopback condition occurs. In FIG. 3, a loss of receipt of the carrier (i.e., loss of the characteristic frequencies thereof), or loss of the power supplied to amplifiers 424 or 436 is represented. Both have the same logical consequences. Upon termination of the pulse from the timer 447, a logical 1 is produced at the output of inverters 454 and 455, and loopback occurs. In FIG. 4, a loss of 5 volt power (i.e., to the logic as set forth hereinbefore) results in immediate provision of a logical 1 at the output of inverters 454 and 455, an institution of a loopback condition. In the case of failure of the 26 volt power supply (not shown), all logical states are irrelevant, and the loopback condition is established immediately.

The foregoing is submitted as illustrative of the principles of the present invention, and it is to be understood that numerous alternative embodiments will occur to those of ordinary skill in the art without departure from the spirit or the scope thereof.

We claim:

1. In a full duplex data transmission system having a master station, at least one remote station, and respective transmit and receive communication links between said master station and each said remote station, said system employing a modulation scheme wherein transmitted information occurs in signal bursts of predetermined duration, said bursts being separated by occurrence of a carrier signal having at least one distinctive frequency component not present during said bursts, testing apparatus comprising:
   (a) means, at each said remote station, for detecting signals present on its receive link;
   (b) means, at each said remote station and responsive to said means for detecting, for identifying absence of said distinctive frequency component on its receive link;
   (c) timing means, at each said remote station and responsive to said means for identifying, for producing a logical pulse for at least said predetermined duration after identification of said absence; and
   (d) switch means, at each said remote station, energized by the associated means for identifying and disabled by said logical pulse from the associated timing means, for interconnecting the transmit link with its corresponding receive link independently at each said remote station, thereby to form a loop back to said master station from a remote station at which said absence has been identified.

2. Apparatus as described in claim 1, wherein each said remote station further includes a power supply means, and wherein each locally associated said means for detecting, said means for identifying, and said timing means are operated by the associated power supply, and wherein an associated said switch means is energized by a power reduction of predetermined magnitude from said power supply means.

3. Apparatus as described in claim 1, wherein said carrier includes a plurality of distinctive frequency components, and wherein each said means for identifying comprises a plurality of separate means for identifying a corresponding one of said components.

4. Apparatus as described in claim 3 wherein each of said plurality of separate means for identifying comprises a phase locked loop having a local oscillator tuned to a corresponding one of said components.

5. Apparatus as described in claim 1, wherein said transmitted information comprises a quadra-phase modulated signal burst on a carrier having first and second ones of said distinctive frequency component, wherein each said means for identifying comprises:
   (i) a first phase locked loop responsive to said means for detecting, tuned to said first component;
   (ii) active filter means responsive to said means for detecting, for providing gain to said second component and for attenuating all other frequency components; and
   (iii) a second phase locked loop responsive to said filter means and tuned to said second component, said phase locked loops each providing a binary output signal indicative of presence or absence of its corresponding component.

6. In a full duplex data transmission system having a master station, at least one remote station, and respective transmit and receive communication links between said master station and each said remote station, said system employing a modulation scheme wherein transmitted information occurs in signal bursts of predetermined duration, said bursts being separated by occurrence of a carrier signal having at least one distinctive frequency component not present during said bursts, a testing method, independently conducted at each said remote station, comprising the steps of:
   (a) detecting signals present on a receive link at said remote station;
   (b) identifying absence of said distinctive frequency component in said detected signals;
   (c) producing a logical pulse having at least said predetermined duration, commencing at identification of said absence; and
   (d) interconnecting the transmit and receive links at said remote station if said identified absence is still extant upon termination of said logical pulse, thereby forming a loop back to said master station from a remote station at which said absence has been identified.

7. A method as described in claim 6, wherein at least one of said detecting, identifying, and producing steps is further conditioned upon the existence of predetermined voltage conditions in said remote terminal, and wherein said interconnecting step is further enabled upon failure of said predetermined voltage conditions.

* * * * *